(12) United States Patent
Wulff et al.

(10) Patent No.: US 7,504,948 B2
(45) Date of Patent: Mar. 17, 2009

(54) WIRELESS RUGGED MOBILE DATA CAPTURE DEVICE WITH INTEGRATED RFID READER

(75) Inventors: Thomas E. Wulff, No. Patchogue, NY (US); Mark Duron, East Patchogue, NY (US); Justin Hotard, Arlington, VA (US); Brian Viscount, Mount Sinai, NY (US); Ian Chamberlin, Germantown, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 253 days.

(21) Appl. No.: 11/410,964

(22) Filed: Apr. 26, 2006

(65) Prior Publication Data

US 2007/0252702 A1 Nov. 1, 2007

(51) Int. Cl.
*G08B 13/14* (2006.01)

(52) U.S. Cl. ............ 340/572.1; 340/10.3; 340/572.8; 340/572.9; 343/700 R; 343/720; 235/375; 235/385; 235/435; 700/213; 700/214

(58) Field of Classification Search ............ 340/772.1, 340/572.1–572.8, 10.3; 235/383, 435, 375, 235/385; 700/213, 214; 343/720, 723, 764–767, 343/841, 866, 883, 901
See application file for complete search history.

(56) References Cited

U.S. PATENT DOCUMENTS

| | | | |
|---|---|---|---|
| 5,804,810 A * | 9/1998 | Woolley et al. | ............ 235/492 |
| 5,995,019 A | 11/1999 | Chieu et al. | |
| 6,078,251 A * | 6/2000 | Landt et al. | ............ 340/10.41 |
| 6,107,910 A | 8/2000 | Nysen | |
| 6,433,671 B1 | 8/2002 | Nysen | |
| 6,531,957 B1 | 3/2003 | Nysen | |
| 6,580,358 B1 | 6/2003 | Nysen | |
| 6,950,009 B1 | 9/2005 | Nysen | |
| 2005/0201826 A1 * | 9/2005 | Zhang et al. | ............ 404/2 |
| 2005/0246248 A1 | 11/2005 | Vensuna | |
| 2006/0255954 A1 * | 11/2006 | Sorenson et al. | ......... 340/572.8 |
| 2007/0109096 A1 * | 5/2007 | Breedlove | ............ 340/5.72 |

OTHER PUBLICATIONS

O'Connor, C. Mary, Smart Pakaging Sells Forklift Readers, Mar. 24, 2005, RFID Journal.*

Engelbrecht, R.S. et al., *"A Wide-Band Low Noise L-Band Balanced Transistor Amplifier"*, Proceedings of the IEEE, vol. 53, No. 3, Mar. 1965. pp. 237-247.

Kurokawa, K., *"Design Theory of Balanced Transistor Amplifiers"*, The Bell System Technical Journal, vol. 44, Oct. 1965, pp. 1675-1698.

(Continued)

*Primary Examiner*—Jeff Hofsass
*Assistant Examiner*—Sisay Yacob

(57) ABSTRACT

A rugged, mobile, wireless data capture device with an integrated radio frequency identification ("RFID") reader is described. The wireless data capture device includes a durable, sealed enclosure. A wireless microprocessor is mounted within the enclosure. An RFID reader is coupled to the wireless microprocessor and mounted within the enclosure. The enclosure also supports a mounted communications antenna that is communicatively coupled to the wireless microprocessor, as well as RFID reader antenna communicatively coupled to the RFID reader. A power supply system supplies power to the data capture device. Finally, the durable, sealed enclosure includes mounting means for securing the enclosure to industrial equipment in a manner that mitigates effects of physical shock and vibration.

47 Claims, 13 Drawing Sheets

OTHER PUBLICATIONS

International Search Report for Application No. PCT/US07/09877, mailed Jul. 14, 2008, four (4) pages.

O'Connor, Mary C., *"Smart Packaging Sells Forklift Readers,"* RFID Journal Online Publication, Mar. 24, 2005, pp. 1-2.

* cited by examiner

WIRELESS RUGGED MOBILE DATA CAPTURE DEVICE WITH INTEGRATED RFID READER

BACKGROUND OF THE INVENTION

1. Field of the Invention

The invention relates to radio frequency identification (RFID) readers, and in particular, to a wireless, rugged, mobile data capture device with an integrated data capture device.

2. Background Art

Radio frequency identification (RFID) tags are electronic devices that may be affixed to items whose presence is to be detected and/or monitored. The presence of an RFID tag, and therefore the presence of the item to which the tag is affixed, may be checked and monitored wirelessly by devices known as "readers." Readers typically have one or more antennas transmitting radio frequency signals to which tags respond. Since the reader "interrogates" RFID tags, and receives signals back from the tags in response to the interrogation, the reader is sometimes termed as "reader interrogator" or simply "interrogator."

With the maturation of RFID technology, efficient communication between tags and readers, and between readers and data management systems, has become a key enabler in supply chain management. This is especially true in manufacturing, shipping, and retail industries, as well as in building security installations, healthcare facilities, libraries, airports, warehouses etc. The requirements for data capture devices including RFID tag readers are thus becoming more difficult to meet. For instance, reading of tags often takes place in an environment where the reader experiences physical abuse, such as in a warehouse environment, or where objects may impact the reader and its supporting hardware, such as the RFID antenna. Thus, what is needed are data capture devices, including RFID readers, that are rugged enough to withstand environmental abuse and capable of operating in an environment having highly reflective objects. What is also needed is the ability for the data capture device to seamlessly, reliably, and in real-time, relay captured data to a central database management system.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 1A-B show views of an industrial forklift with a mounted wireless, rugged, mobile data capture device.

FIG. 2 shows an exemplary RFID reader.

FIG. 3A-B show the exterior features of a wireless, rugged, mobile data capture device.

Figure 1A:
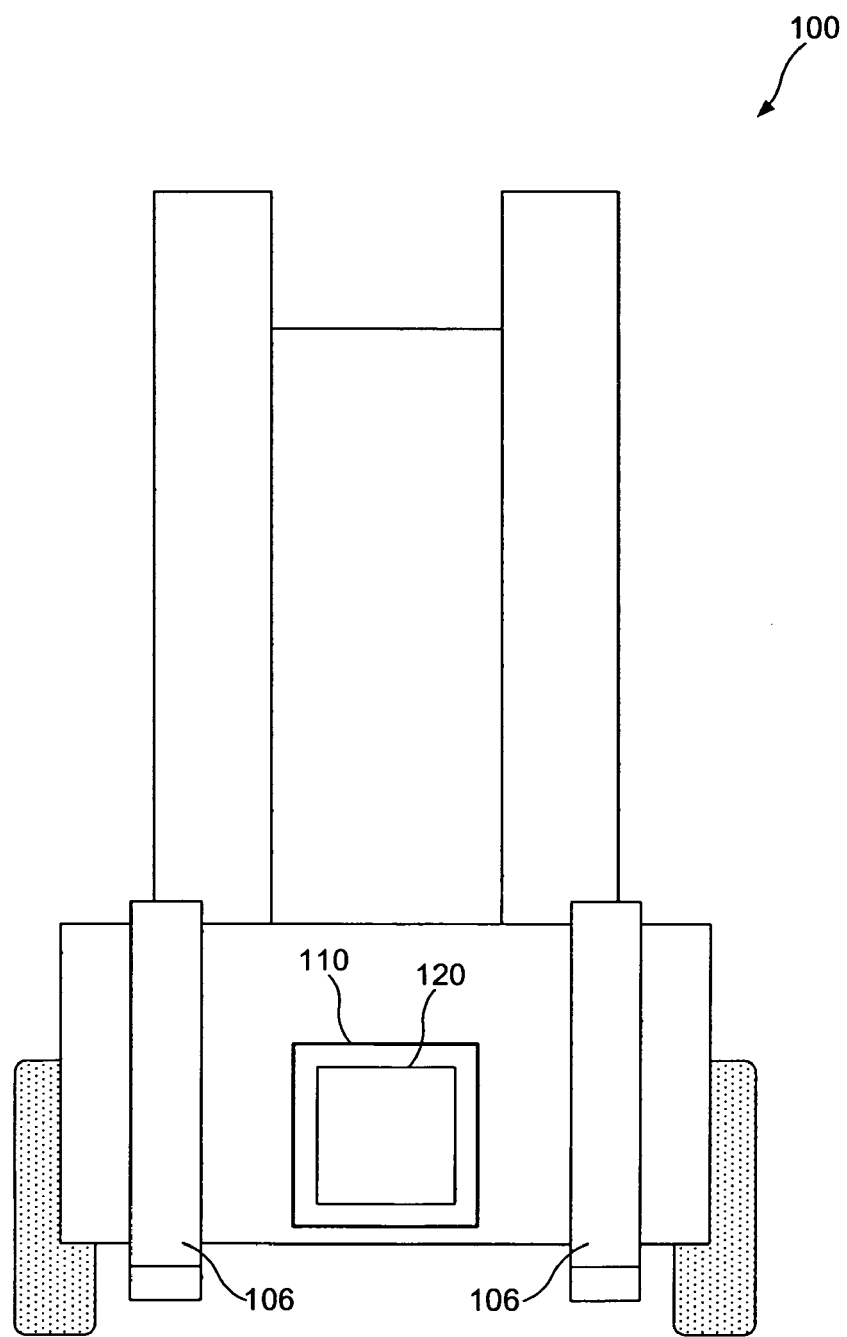

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

A system and apparatus for a wireless, rugged, mobile data capture device with an integrated wireless RFID reader is described herein. The wireless data capture device described herein provides for increased durability, flexibility and reliability in abusive industrial environments. Furthermore, the described wireless data capture device is capable of operating on mobile industrial equipment such as forklifts, conveyer belts, pallet jacks and the like. Finally, the wireless data capture device is also able to instantaneously relay captured data, such as RFID tag data, to database management systems.

The present specification discloses one or more embodiments that incorporate the features of the invention. The disclosed embodiment(s) merely exemplify the invention. The scope of the invention is not limited to the disclosed embodiment(s). Rather, the invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Furthermore, it should be understood that spatial descriptions (e.g., "above," "below," "up, " "down," "top," "bottom," "vertical," "horizontal," "interior," "exterior" etc.) used herein are for purposes of illustration only, and that practical implementations of the structures described herein can be spatially arranged in any similarly suitable orientation or manner.

Example RFID System Embodiment

Figure 1B:
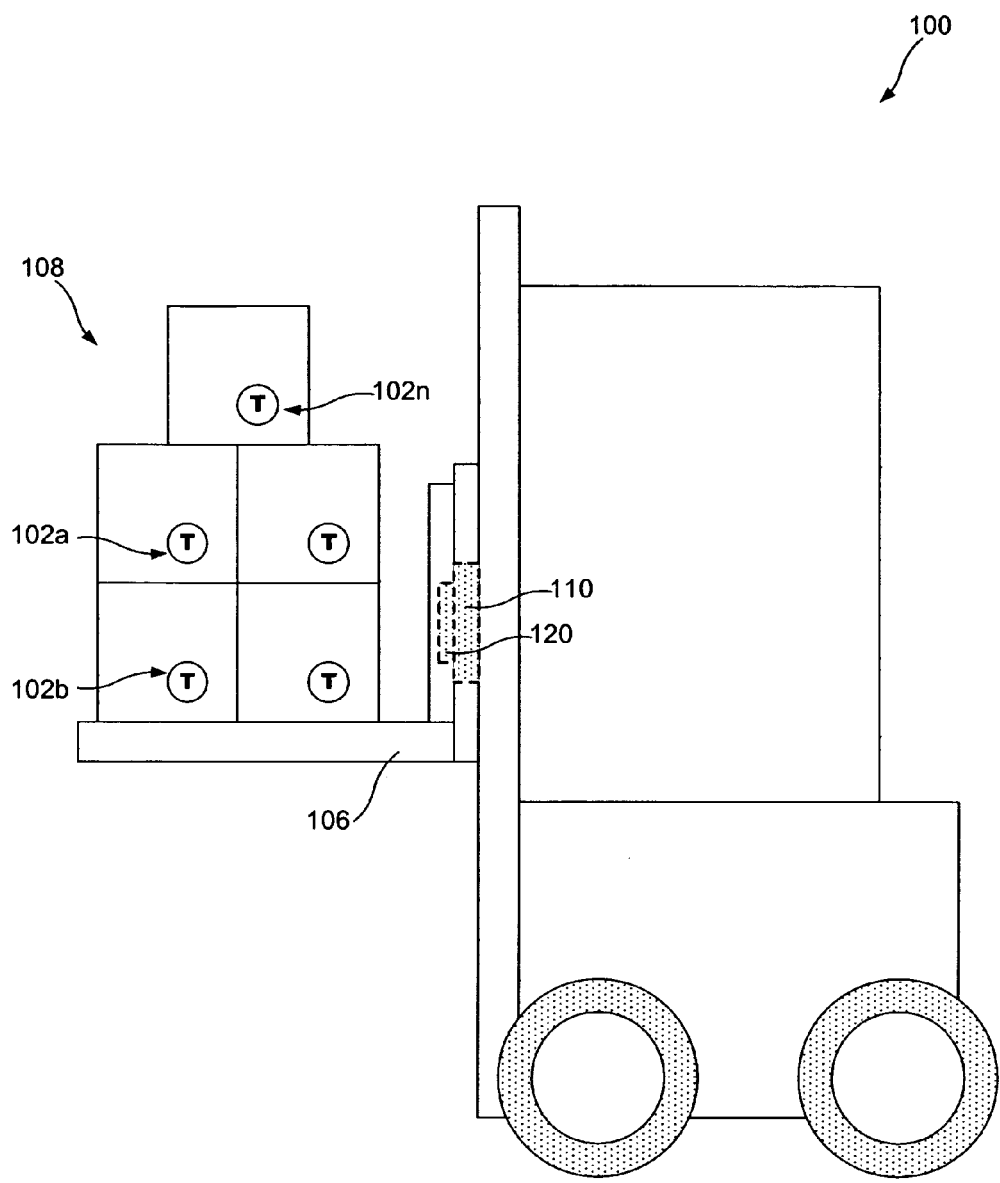

Before describing embodiments of the present invention in detail, it is helpful to describe an example environment in which the data capture device may be implemented. FIG. 1 illustrates a forklift 100 where a wireless, rugged, mobile data capture device 110 having an integrated RFID reader (not shown) communicates with an exemplary population of RFID tags 102 embedded within a forklift cargo 108. Communication with the RFID tags 102 is enabled via an RFID antenna assembly 120. A population of RFID tags may include any number of tags 102a-n.

The illustrated wireless data capture device 110 is disposed between the forks 106 of forklift 100 (e.g., in the "load back rest" area). The wireless data capture device 110 may be requested by an external application to address the population of tags 102 using its integrated RFID reader. Alternatively, the wireless data capture device 110 may have internal logic that initiates communication, or may have a trigger mechanism that an operator of data capture device 110 uses to initiate communication. Such features are described more fully below. To capture data associated with the RFID tags 102, the wireless data capture device 110, via its integrated RFID reader and RFID antenna assembly 120, transmits an interrogation signal having a carrier frequency to the population of tags 102. The integrated RFID reader operates in one or more of the frequency bands allotted for this type of RF communication. For example, frequency bands of 902-928 MHz and 2400-2483.5 MHz have been defined for certain RFID applications by the Federal Communication Commission (FCC).

Various types of tags 102 may be present in tag population 102*a-n* that transmit one or more response signals to an interrogating RFID reader. For example, the RFID tags 102 may alternately reflect and absorb portions of the signal according to a time-based pattern or frequency. This technique for alternatively absorbing and reflecting signal is referred to herein as backscatter modulation. Other technologies are known in the art. The integrated RFID reader receives and obtains data from response signals via RFID antenna assembly 120, such as an identification number of the responding tag 102. In the embodiments described herein, a wireless data capture device 110 with an integrated RFID reader may be capable of communicating with tags 102 according to any suitable communication protocol, including binary traversal protocols, slotted aloha protocols, Class 0, Class 1, EPC Gen 2, any others mentioned elsewhere herein, and future communication protocols.

Figure 2:
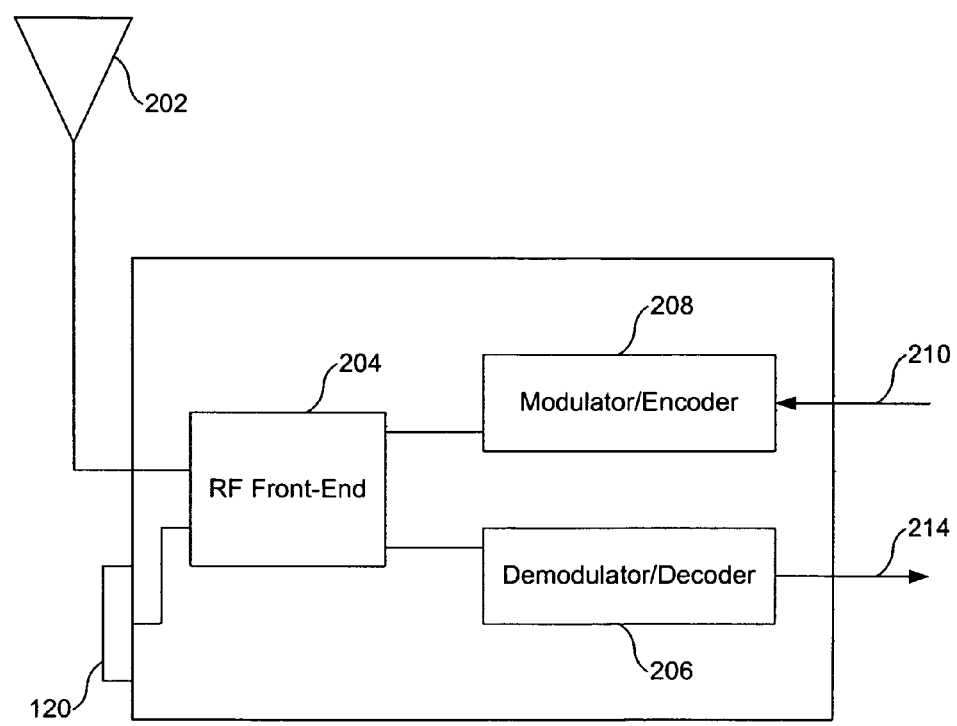

FIG. 2 shows a simplified block diagram of an RFID reader 220. RFID reader 220 may be coupled to one or more multipurpose communication antennas 202, and may include an RFID antenna assembly 120, a RF front-end 204, a demodulator/decoder 206, and a modulator/encoder 208. These components of reader 220 may include software, hardware, and/or firmware, or any combination thereof, for performing their function.

The RFID reader 220 is coupled to at least one communications antenna 202 for wireless communication with, for example, other wireless readers, mobile computers, or with a remote database management system. RF front-end 204 may also include one or more RFID antenna assemblies 120 with matching elements, amplifiers, filters, an echo-cancellation unit, a down-converter, and/or an up-converter. RF front-end 204 receives a tag response signal through RFID antenna assembly 120 and down-converts (if necessary) the response signal to a frequency range amenable to further signal processing. Furthermore, RF front-end 204 receives a modulated encoded interrogation signal from modulator/encoder 208, up-converts (if necessary) the interrogation signal, and transmits the interrogation signal to RFID antenna 120 to be radiated.

Demodulator/decoder 206 is coupled to an output of RF front-end 204, receiving a modulated tag response signal from RF front-end 204. Demodulator/decoder 206 demodulates the down-converted tag response signal. The tag response signal may include backscattered data encoded according to FM0 or Miller encoding formats. Demodulator/decoder 206 outputs a decoded data signal 214. Decoded data signal 214 is further processed in the wireless data capture device 110. Additionally or alternatively, decoded data signal 214 may be transmitted to an external computer system for further processing. Modulator/encoder 208 is coupled to an input of RF front-end 204, and receives an interrogation request 210. Modulator/encoder 208 encodes interrogation request 210 into a signal format, such as one of FM0 or Miller encoding formats, modulates the encoded signal, and outputs the modulated encoded interrogation signal to RF front-end 204.

In embodiments of the present invention, the wireless RFID reader is integrated into a multi-feature, wireless, rugged, mobile data capture device 110. Other features of this device are more fully described below.

Wireless Rugged Mobile Data Capture Device Exterior

Figure 3A:
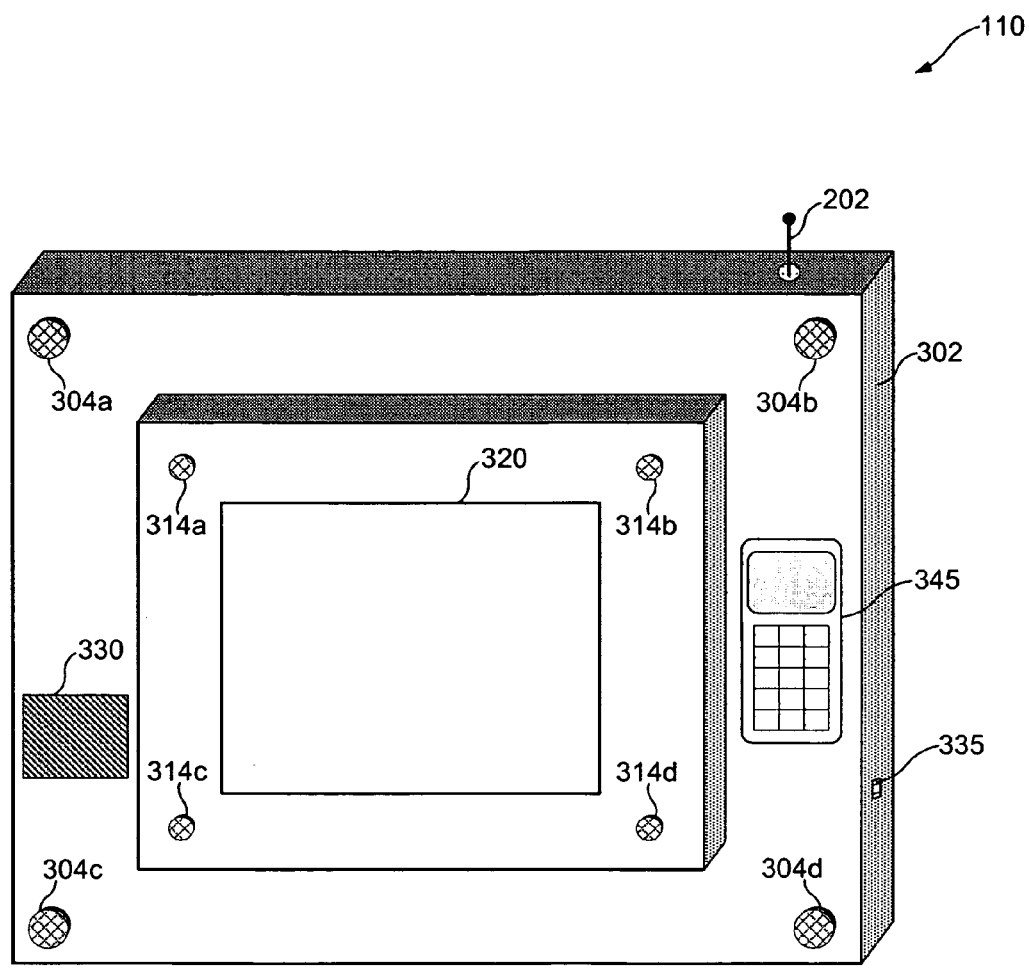
Figure 3B:
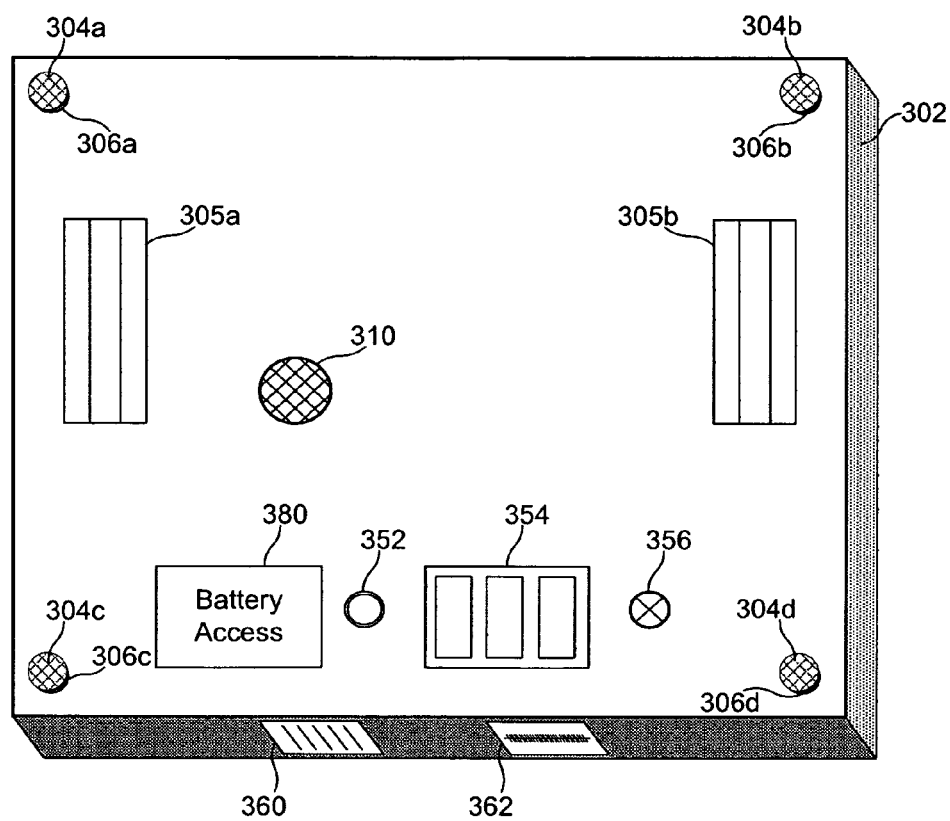

FIGS. 3A and 3B illustrate front-top and rear-bottom views, respectfully, of an exterior embodiment of a wireless, rugged, mobile data capture device. The wireless data capture device includes a durable sealed enclosure 302 designed to withstand the abuses of industrial environments. The durable enclosure 302 could be manufactured from a die cast metallic material, thixomolded metallic material, and injection molded plastic. The durable enclosure 302 is designed to withstand direct impacts, and shock loads due to the close proximity of the freight being transferred. The durable enclosure 302 is also sealed to prevent dust and water penetration. As illustrated in more detail below with respect to FIG. 4, a wireless microprocessor 402 is mounted within the enclosure and coordinates the activity of the wireless, rugged, mobile data capture device and its described features.

To insure a robust reader system solution, the wireless data capture device is capable of being mounted in close proximity to the freight being transferred. This includes being mounted at, or between the forks 106 on forklift 100, as illustrated in FIG. 1. The wireless data capture device could alternatively be mounted on pallets jacks, hand trucks, conveyor belts, and any other type of industrial freight moving equipment. The durable sealed enclosure 302 therefore includes modular mounting means for securing the enclosure 302 and its hardware to industrial equipment such as forklift 100. The mounting means mitigates the effects of physical shock and vibration with the use of, for example, shock absorbing material, springs or other similar devices. The wireless data capture device uses a modular mounting concept constructed with standardized units or dimensions, thereby allowing flexibility and variety in use. This enables the device to be mounted on many different types of industrial equipment without the need for customizing, or changing the wireless data capture device.

For instance, the mounting means could include a simple nut and bolt arrangement passed through holes 304*a-d* for securing the durable enclosure 302 to industrial equipment, as illustrated in FIGS. 3A-B. Such an arrangement would ideally have shock mounting features such as insulating rubber vibration pads 306*a-d*, as shown in FIG. 3B. Alternatively, the modular mounting means could be a simple tongue-and-groove mounting plate or bracket arrangement 305*a-b*, which would include corresponding mating parts on the industrial equipment. The mounting means may also use a mounting cradle (not shown) into which the durable sealed enclosure 302 rests. The skilled artisan could envision a variety of modular mounting techniques.

As illustrated in FIG. 3A, a communications antenna 202 is mounted proud (e.g., extending outward, not flush) on the durable sealed enclosure 302 and is communicatively coupled to a wireless microprocessor of the mobile data capture device. The communications antenna 202 could also be flush-mounted on durable enclosure 302, or internally mounted for increased ruggedness and to reduce likelihood of damage in an industrial environment. Communications antenna 202 is ideally a multi-purpose antenna that permits wireless communication with a remote communications network. The remote communications network may be a wide area network (WAN), a local area network (LAN), a personal area network (PAN), or even a global positioning system (GPS) network.

As further illustrated in FIG. 3A, the durable sealed enclosure 302 also permits wired communication with a wireless microprocessor mounted therein. For example, a wired connection 352 (shown in FIG. 3B), when present, permits connection to a coaxial communications cable, and a wired connection 354 (shown in FIG. 3B), when present supports a number of universal system bus (USB), Ethernet, or Firewire connections. The front side of the durable sealed enclosure may also include a keypad and display 345 for direct communication with the wireless microprocessor mounted within. Other illustrated features include a proximity or motion detector 330, and a manual on/off switch 335.

Finally, FIG. 3A illustrates an RFID antenna assembly 120. The features of the RFID antenna assembly 120 are described more fully below. The RFID antenna assembly 120 can be mounted proud of the external surface of the durable, sealed enclosure 302, or could be mounted flush with the external surface. An external flush mounted antenna capable of with standing high impact loads is preferred. External RFID antenna connectors (not shown) may also be provided to allow the wireless data capture device 110 to use several externally mounted antennas if required for unique applications. Alternatively, the RFID antenna assembly 120 could be mounted within the durable sealed enclosure 302, wherein the enclosure permits the transmission and reception of RFID signals.

In addition to, or in place of, the antenna assembly 120, other data capture devices could be installed, such as a laser scanner device, an optical imager device, or an infra-red data association (IRDA) device. Such data capture devices could be mounted externally to the durable enclosure 302 and communicatively coupled to the wireless microprocessor. Alternatively, such data capture devices could be integrated with the durable sealed enclosure, in which case the durable sealed enclosure 302 would be configured to permit the transmission and reception of the appropriate data signal—e.g., infra-red data, visible light, or laser light.

As illustrated in FIG. 3B, the back side of durable sealed enclosure 302 may also include an audio speaker 370, a battery access panel 380, and an external power supply connection 356. Furthermore, and as illustrated in more detail below, the durable sealed enclosure 302 may include a set of make-or-break contacts 360 or a wireless inductive contact 362 for battery charging operations. Power supply and management features are more fully described below.

FIGS. 3A-B serve to illustrate some of the preferred features of the wireless, rugged, mobile data capture device. The placement of the features in FIGS. 3A-B is not, however, intended to be limiting, and the skilled artisan could easily conceive and implement alternate locations for each described feature. Furthermore, while the illustrated features have been described with respect to the durable sealed enclosure 302, each feature or device is coupled to and interacts with the wireless microprocessor mounted within the durable sealed enclosure 302 through device-appropriate couplings. Further details of the described features are illustrated more fully below with respect to FIG. 4.

Wireless Rugged Mobile Data Capture Device Interior

Figure 4:
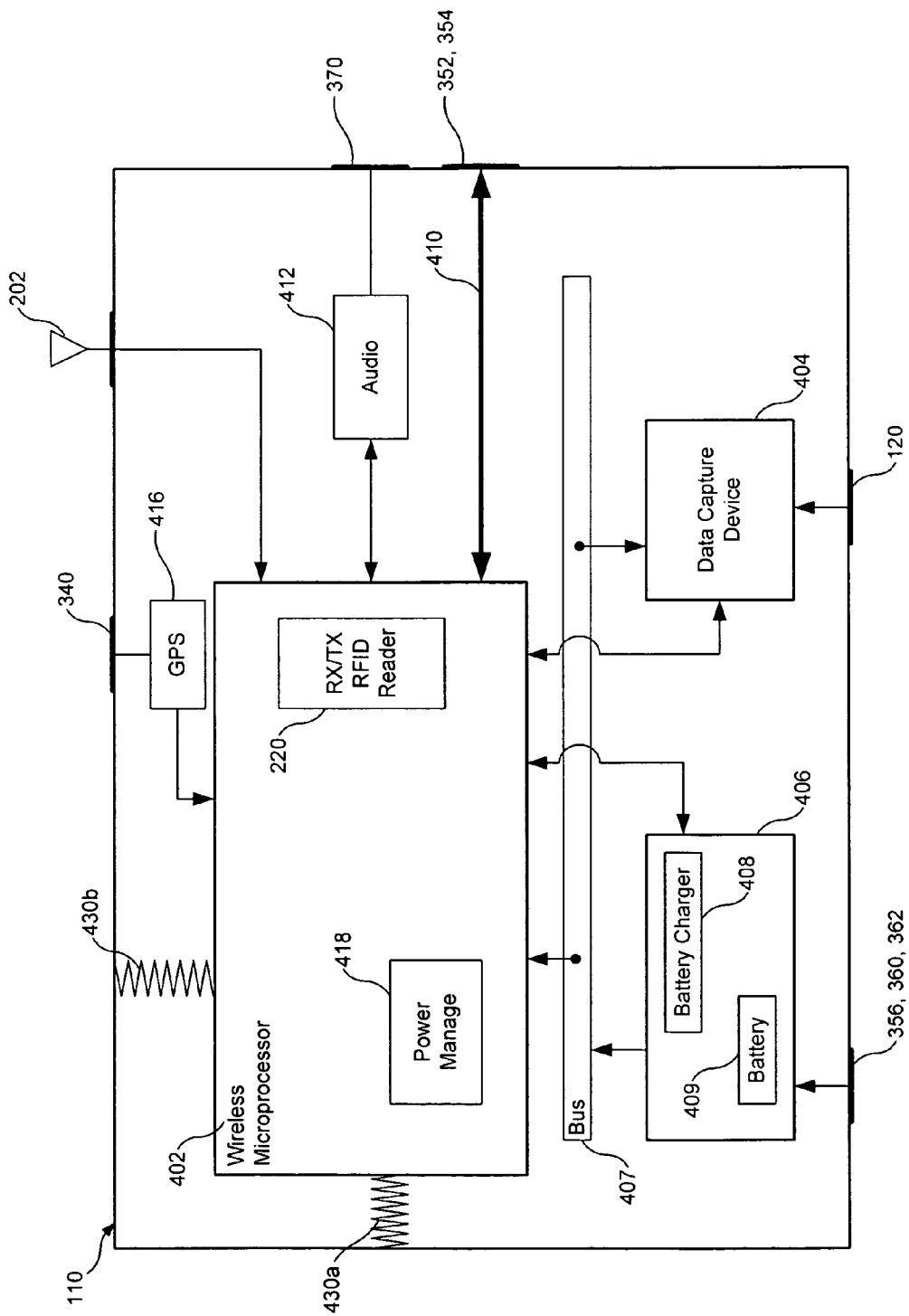
FIG. 4 is a block diagram of an exemplary a wireless, rugged, mobile data capture device with an integrated RFID reader.

FIG. 4 illustrates a block diagram of the interior of the wireless, rugged, mobile data capture device 110. FIG. 4 is not intended to be limiting, but rather is intended to illustrate the various features that have been incorporated into the wireless, rugged, mobile data capture device 110. At the heart of the wireless data capture device is a wireless microprocessor 402. This onboard wireless computer can be shock mounted within the sealed durable enclosure 302 with shock absorbing material, springs 430a-b or the like.

Wireless microprocessor 402 could be one of numerously available commercial microprocessors such as Qualcomm's 1 GHz SCORPION™ mobile microprocessor, or one of Intel's CENTRINO™ platforms that include, for example, WiMax capabilities. Through the wireless microprocessor 402, the wireless data capture device and integrated RFID reader 220 can be used in conjunction with other devices such as handheld computers, fix mounted forklift or handtruck computers, barcode scanners, etc. via wired or wireless communication network connections. For instance, a wireless communications module (including wireless microprocessor 402) may be configured to communicate according to WLAN (e.g., IEEE 802.11) and/or BLUETOOTH (e.g., IEEE 802.15) standards. The wireless communications module may communicate with an access point located elsewhere on forklift 100 or located external to forklift 100.

Another feature of wireless, rugged, mobile data capture device 110 is a power supply system 406 and a power management system 418. For maximum reliability and flexibility, a number of options exist for supplying power to wireless data capture device 110. For instance, power may be supplied by a battery 409, or by an external power source provided from, for example, forklift 100. The battery 409 may be a rechargeable battery, a removable battery, or both. A power supply bus 407 is coupled to power supply system 406 and distributes power throughout the wireless, rugged, mobile data capture device 110. Details of the power management system 418 and power supply options and features are described in more detail below.

Other features illustrated in FIG. 4 include a global positioning satellite (GPS) receiver 416, an audio circuit 412, both of which are coupled to the wireless microprocessor 402. Additionally, there is a wired communications bus 410 that is disposed between the plurality of wired communications connections 352, 354 and the wireless microprocessor 402.

Power Supply and Management Systems

As noted above, a number of options exist for supplying power to the wireless data capture device 110 for maximum reliability and flexibility. The power supply system 406 may include a battery 409 and a battery charging circuit 408. The power supply system 406 receives power for charging the battery 409 from an external power connector. A variety of options are available for the external power connector. For example, as illustrated in FIG. 3B, the durable sealed enclosure 302 could include external charging contacts consisting of make-or-break electromechanical contacts 360 or an internal inductive coupling 362. Alternatively, the external power connection could be a traditional cable connector 356. The battery 409 may be charged while in the rugged, wireless, data capture device 110 via one of the described external power connectors and battery charging circuit 408. Alternatively, it could be removed and charged in standard charging accessories.

The wireless data capture device 110 is also capable of communicating with an external battery-charging accessory (not shown). Such communication would enable an external battery-charging accessory to monitor the state of charge of the removable, rechargeable battery 409 in the wireless data capture device 110, and adjust its charge accordingly. For example, if the removable, rechargeable battery 409 in the wireless data capture device 110 were at a low state, and a corresponding removable, rechargeable battery 409 in the external charging accessory was not at a full charge, the wireless data capture device 110 could send a signal to the external charging accessory directing it to increase the rate of charge for the battery in the external charging accessory such that it would be fully charged when the battery 409 was fully discharged and ready to be changed. The external battery-charging accessory could be wired and mounted to the same forklift 100 as the rugged, wireless, data capture device 110.

The battery 409 could also be directly charged from the freight moving equipment to which it is mounted, i.e., forklift truck, pallet jack, etc. For example, the power supply system 406 could be wired directly to the external charging contacts consisting of make-or-break electromechanical contacts 360 or an internal inductive coupling 362. Alternatively, the power supply system 406 could be wired directly to the external traditional cable connector 356.

The external power connections 356, 360, 362 could be integrated into the modular mounting system. For example, the forklift 100 could have corresponding wired charging contacts fixed to a mounting plate (not shown) located at the base of the forklift 100. The rugged, wireless, data capture device 100 would be installed at the forks for maximum system read performance, and would move up and down with the freight. Upon lowering the forks to the down position (normal forklift operate and drive position), the wireless data capture device 110 external charging contacts would make contact with the corresponding forklift charging contacts located on the fixed mounting plate (not shown) at the base of the forklift 100.

In another example, a mounting cradle (not shown) could be mounted and wired to the forklift 100. The wireless data capture device would be placed and retained by the mounting cradle. The mounting cradle utilizes charging contacts that would interface with the wireless data capture device external charging contacts. In both previous examples, the external charging contacts on the forklift 100 and rugged, wireless data capture device could be classic electromechanical contacts (plated cantilever beams, coil, pogo-pins, torsional, pads, male/female, etc.), or they could be inductive type contacts inlayed within the housing and charging structure.

A number of power management techniques for enhanced battery life can be employed by the rugged, wireless data capture device 110. These include, but are not limited to using a predetermined duty cycle, a proximity sensor, motion sensor or other automatic or manual triggering mechanisms. A proximity or motion sensor 330 could be integrated with the sealed, durable, enclosure 302 as illustrated in FIG. 3A.

In a system using a duty cycle, the system would have the capability to shut various systems off and on to conserve battery power. For example, the RFID radio could be shut off and on based on a predetermined time interval, while still maintaining a robust system read capability.

In a system using a proximity sensor, the wireless data capture device 110 could be in a sleep mode until something is put in its path at a predetermined minimum range. For example, the unit is in sleep mode until the forklift 100 got within two feet of a pallet loaded with freight, at which occurrence the unit would enter an awake mode. After the wireless data capture device 110 was turned on to read the appropriate tags, it would go back into sleep mode until the pallet or freight was off-loaded. The decoupling of the proximity sensor would turn the unit back on, reading the appropriate tags again, confirming that the freight was dropped off. The proximity sensor could be based on any switch technology, i.e., IR, sonic, optical, etc.

In a system using a motion sensor, the wireless data capture device 110 could be in sleep mode until motion was detected. Upon not sensing motion for a predetermined period of time, the wireless data capture device 110 would go back into sleep mode. The motion sensor can be based on, but not limited to; switch, accelerometer, strain gage, piezo, and MEMs technologies, including combinations of the like.

The wireless data capture device 110 could also incorporate triggering functions based upon the specific user applications. For example, the wireless data capture device 10 could have its reader turn on and off by having the user manually trigger the device only when interested in reading tags. For example, when the forklift operator picks up a pallet, the device is triggered. When the pallet is moved and put in another location, the device is triggered again. This manual trigger could be from any remote device working on the network, i.e., a hand-held computer, a vehicle mounted computer, a remote control, etc. The manual trigger could be a wired trigger or a wireless trigger.

Wireless Rugged Mobile Data Capture Device Antenna Parameters and Issues

An important feature of the wireless, rugged, mobile data capture device 10 with an integrated RFID reader 220 is its associated RFID antenna assembly 120. An exemplary RFID antenna is described in the co-pending U.S. patent application Ser. No. 11/265,143, filed Nov. 3, 2005, entitled "Low Return Loss Rugged RFID Antenna," ("the '143 application") which is hereby incorporated by reference in its entirety. Some RFID antenna considerations are discussed next.

Many types of antennas exist such as patch antennas, cavity-backed patch antennas, inverted-F antennas, monopoles, dipoles, and Yagi antennas. For most applications, an antenna with a voltage standing wave ratio ("VSWR") specification of 2:1, or better, may be adequate. A 2:1 VSWR equates to a return loss of −9.54 dB, and represents a worse case transmission loss of −0.51 dB. For certain environments, however, an antenna VSWR of 1.5:1 has been specified, which equates to a return loss of −14 dB, and a worse case transmission loss of −0.18 dB.

A new set of requirements is being introduced for RFID device antennas, including return losses of −20 to −30 dB, which equates to a VSWR of 1.22 to 1.065, respectively, across a frequency band of interest (often 902 to 928 MHz). This new requirement is not necessarily for the purpose of maintaining transmission efficiency, but is present to avoid saturation of RFID receivers that can occur when a return loss above −20 dB is present.

As noted above, the present invention is directed to a wireless, rugged, mobile data capture device 110 whose integrated RFID reader 220 is used in environments that can be highly physically abusive to the antenna. In such applications, even an antenna that has been carefully tuned to provide an acceptable performance will usually degrade in performance, due to the physical abuse and damage that can result from impacts to the antenna by objects being transported by, or crushed within, these types of machinery. Antennas may be protected by placing them within a transparent radome, which can withstand impacts. However, this technique requires compromise between the physical strength and the RF transparency of radomes, as well as the disadvantage of added antenna size, including thickness, caused by the radome. Many of these problems are ameliorated in the above incorporated '143 application.

A further difficulty occurs when an RFID tag resides in an environment having large, RF-reflective objects. The reflective objects can create a strong signal return to the RFID reader as a reflection of a reader transmitted signal. This can make the reader susceptible to false tag responses, and/or can mask tag responses, because of the presence of the intermodulation distortion (IMI) products created within the receiver when multiple signals are present in the environment (due to the external reflections). Many of these problems are also ameliorated in the above incorporated '143 application.

Figure 5:
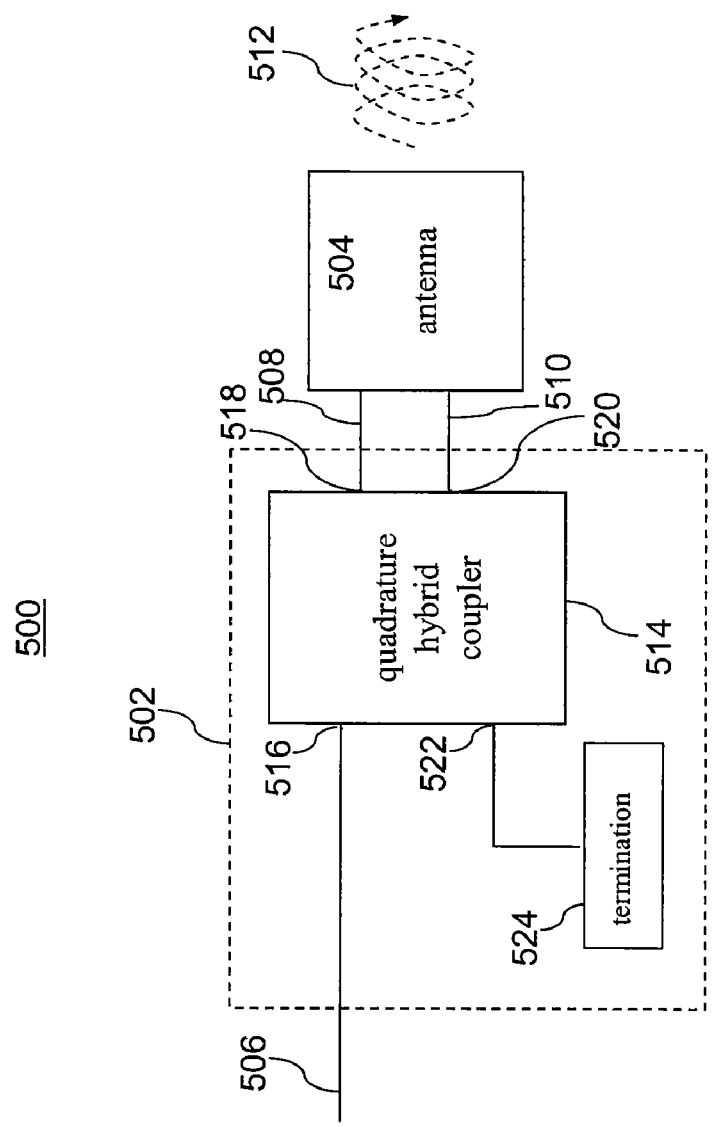
FIG. 5 shows an antenna assembly, according to an embodiment of the present invention.

As shown in FIG. 5, an exemplary antenna system 500 includes a circuit 502 and an antenna 504. Antenna 504 may also be referred to as a "radiator" or "radiating element." Circuit 502 receives an input RF signal 506, such as from a reader transmitter, and outputs a first RF output signal 508 and a second RF output signal 510. Antenna 504 receives the first and second RF output signals 508 and 510, and radiates a an RF signal 512. RF signal 512 may be polarized.

As shown in FIG. 5, circuit 502 includes a quadrature hybrid coupler 514 and a termination element 524. Quadrature hybrid coupler 514 has first, second, third, and fourth ports 516, 518, 520, and 522. First port 516 receives input RF signal 506. Second port 518 outputs first RF output signal 508. Third port 520 outputs second RF output signal 510. Second RF output signal 510 is shifted in phase by 90 degrees (i.e., a quarter wavelength of a signal of interest) relative to first RF output signal 508 by quadrature hybrid coupler 514. Furthermore, first and second RF output signals 508 and 510 are 3 dB reduced with respect to input RF signal 506.

Termination element 524 is coupled to fourth port 522 of quadrature hybrid coupler 514. Termination element 524 can be any type of termination component, or combination of termination components, including a resistor.

Note that a receiver of an RFID reader associated with antenna system 500 receives signals from antenna 504 through input RF signal 506. In other words, for example, when antenna 504 receives a tag response signal, the tag response passes from antenna 504 through quadrature hybrid coupler 514, to the reader receiver via input RF signal 506.

Figure 6:
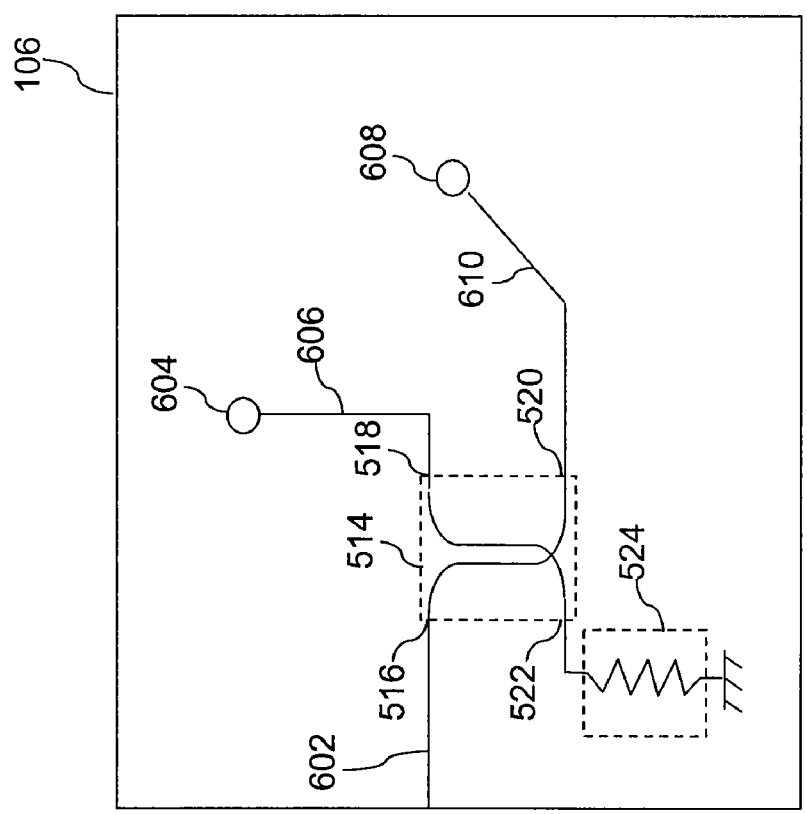
FIG. 6 shows a plan view of an example circuit board that implements the circuit of FIG. 5.

Circuit 502 may be implemented on a circuit board, such as a printed circuit board (PCB). FIG. 6 shows a plan view of an example circuit board 600 that implements circuit 502. As shown in FIG. 6, circuit board 600 mounts quadrature hybrid coupler 514 and termination element 524. As shown in FIG. 6, first port 516 receives input RF signal 506, which is routed to first port 516 by a transmission line 602 on circuit board 600. Transmission line 602 can be any type of transmission line, including, but not restricted to, a coaxial type, a stripline type, a microstripline type, a coplanar waveguide type transmission line.

As shown in FIG. 6, second port 518 is coupled to a first point 604 on circuit board 600 by a transmission line 606, and third port 520 is coupled to a second point 608 on circuit board 600 by a transmission line 610. Transmission lines 606 and 610 can be any type of transmission line. First and second points 604 and 608 on circuit board 600 are coupled to respective first and second points of antenna 504, also referred to as "feed points" for antenna 504, to respectively couple first and second RF output signals 508 and 510 to antenna 504.

Quadrature hybrid coupler 514 provides a balanced impedance match between first and second points 604 and 608 on circuit board 600, to provide matched impedances to the first and second points of antenna 504 that receive first and second RF output signals 508 and 510. For example, quadrature hybrid coupler 514 may be a 3 dB directional coupler, having attributes such as being miniaturized, a high dielectric-type material (e.g., ceramic), and/or being printed circuit board mountable.

Figure 7:
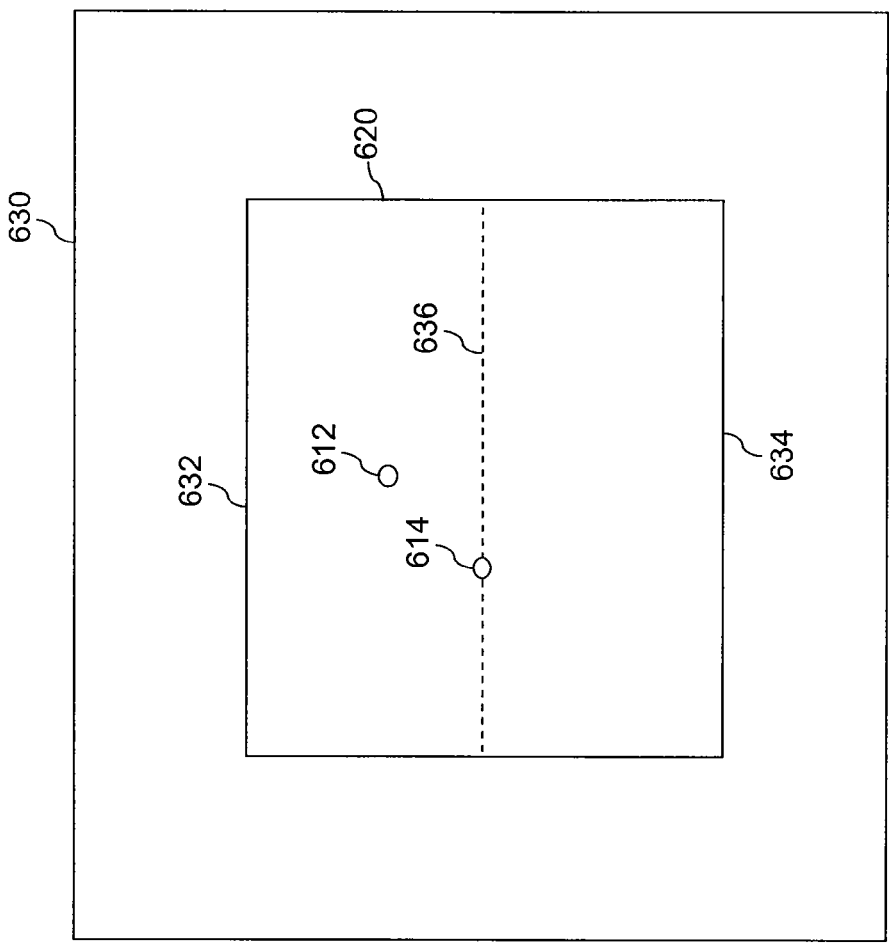
FIG. 7 shows an example antenna.

FIG. 7 shows a bottom view of an antenna 620, which is an example of antenna 504, that can be coupled to circuit board 600 of FIG. 6. FIG. 7 further shows a ground plane element 630, positioned behind antenna 620. Antenna 620 has first and second points 612 and 614, which can be coupled to first and second points 604 and 608 of circuit board 600, when antenna 620 of FIG. 7 is flipped (e.g., horizontally) and mounted over circuit board 600. Such a mounting configuration is shown in FIGS. 8-11, which are described in further detail below. Antenna 620 is shown as a patch antenna in FIG. 7. However, antenna 504 can be an alternative type of antenna, depending on the particular application. First and second points 612 and 614 can be referred to as "feed points" for antenna 620. First and second points 612 and 614 can also be referred to as a "horizontal polarization input" and a "vertical polarization input," respectively, for antenna 620, which combine input signals to form a circularly polarized radiated output signal.

In an example patch antenna embodiment, antenna 620 creates a strong electrical field ("E-field") along its perimeter, in a gap between antenna 620 and ground plane element 630. Antenna 620 generates a hemispherical radiation pattern that radiates outward from a side of antenna 620 this is away from ground plane 630 (i.e., radiates in a direction "out of the paper" in FIG. 7).

Figure 8:
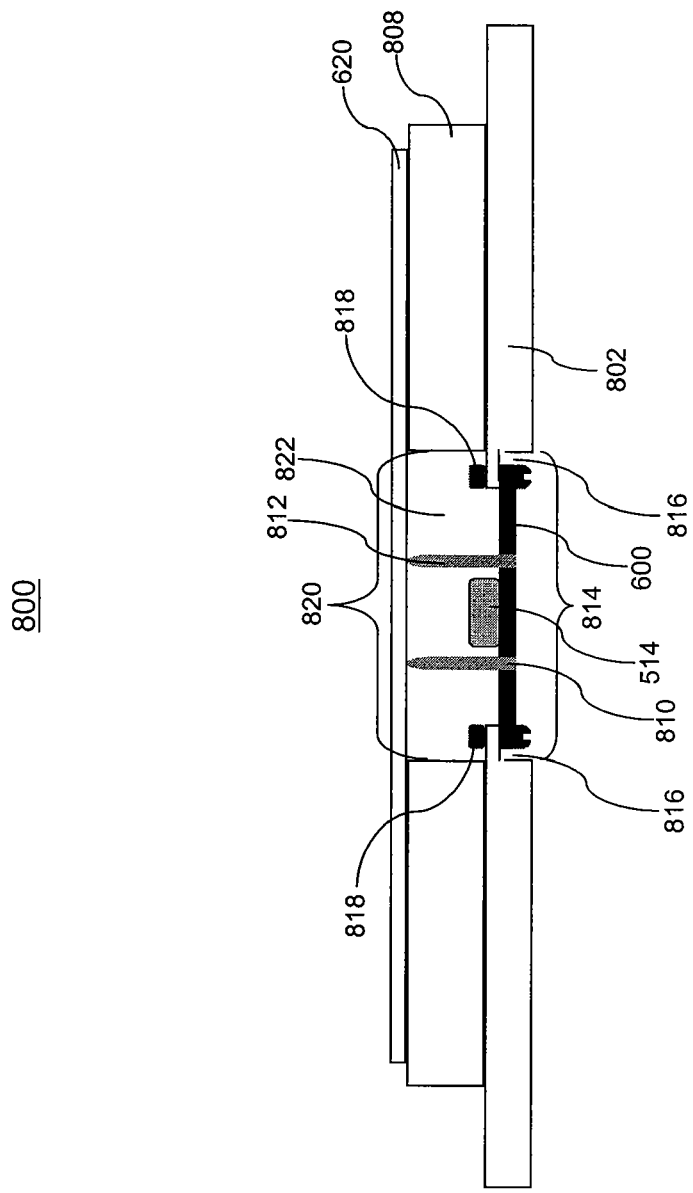
FIGS. 8-11 show views of example antenna structures, according to embodiments of the present invention.

FIG. 8 shows a cross-sectional view of an antenna assembly 800. As shown in FIG. 8, antenna assembly 800 includes a back plate 802, circuit board 600, antenna 620, a compressible electrically insulating material 808, and first and second compressible contact members 810 and 812.

Back plate 802 is a planar, rectangular shaped plate that provides mechanical support and protection for antenna assembly 800. Back plate 802 is typically made from a rigid material, such as a metal, including aluminum, steel, or other metal or alloy/combination of metals. Back plate 802 can have shapes other than shown in FIG. 8, including non-planar, rounded, etc. Back plate 802 is often coupled to ground, to form a larger ground plane for antenna assembly 800, but grounding of back plate 802 is not required.

Figure 9:
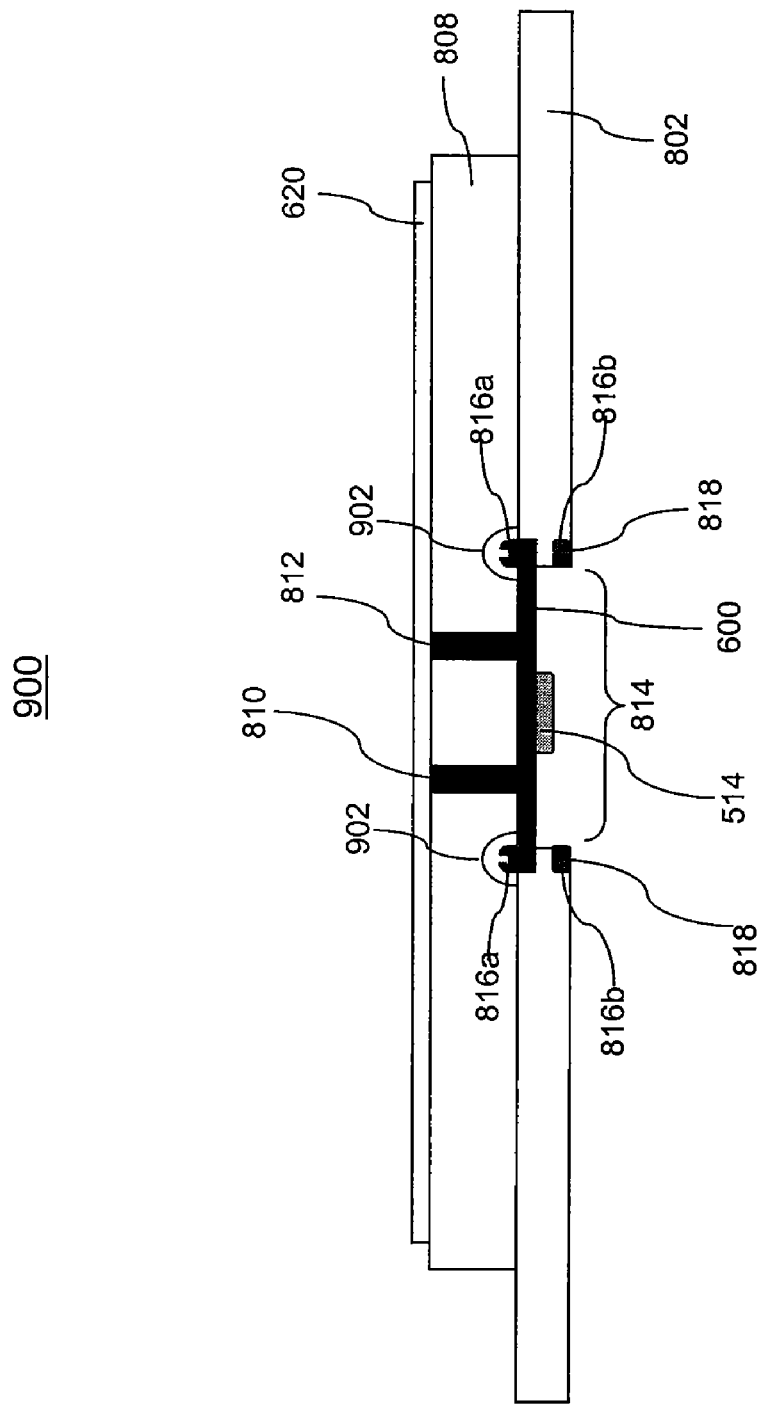
Figure 10:
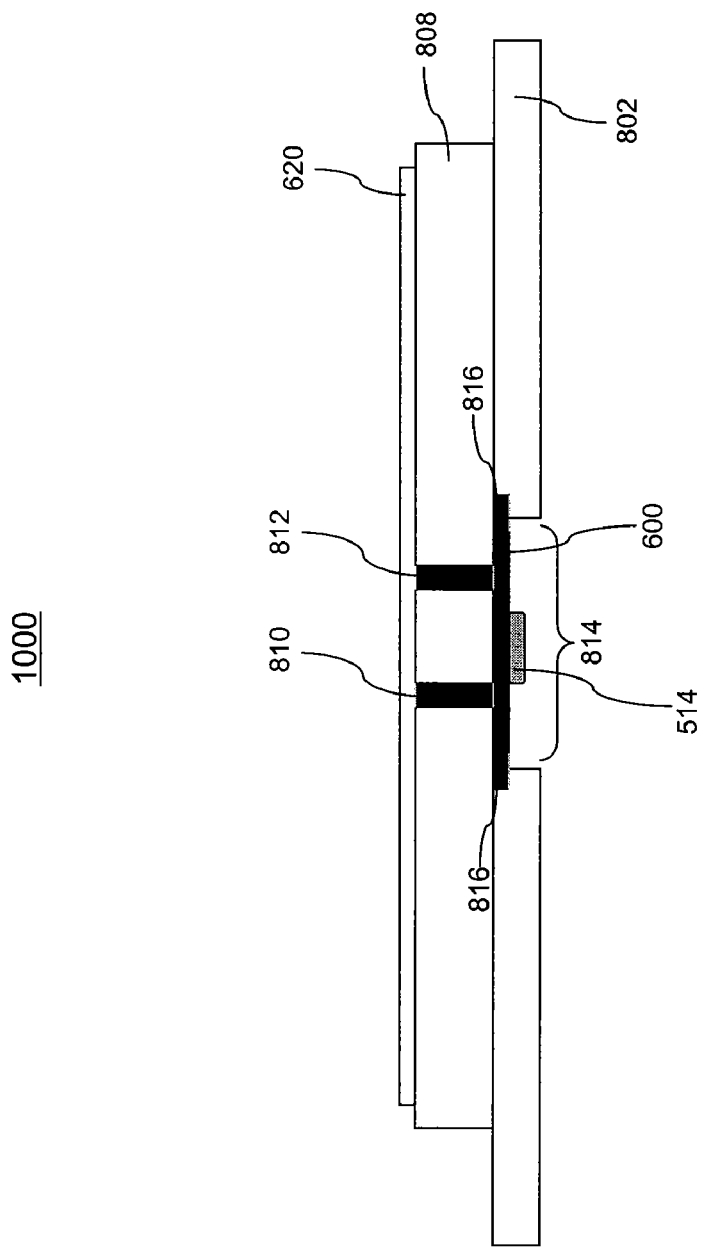

Circuit board 600 is supported by back plate 802. In the embodiment of FIG. 8, back plate 802 has a centrally-located opening 814. Circuit board 600 may be mounted in centrally-located opening 814. For example, a recessed area 816 or ledge may be formed in back plate 802 in a perimeter edge surrounding opening 814. The recessed area 816 may be formed in a bottom surface of back plate 802 (as shown in FIG. 8), may be formed in a top surface of back plate 802 (as shown in FIG. 10), or may be formed in both the top and bottom surface of back plate 802 (as shown in FIG. 9 as recessed areas 816a and 816b). Circuit board 600 may be attached in recessed area 816 by one or more bolts, screws, or other attachment elements, and/or by an adhesive material. For example, FIG. 8 shows circuit board 600 mounted to recessed area 816 in a bottom surface of back plate 802 by a plurality of screws 818.

Antenna 620 is a planar, rectangular shaped plate that operates to radiate RF signal 512. Antenna 620 is typically made from an electrically conductive, rigid material, such as a metal, including aluminum, steel (including stainless steel), or other metal or alloy/combination of metals. Antenna 620 can have shapes other than shown in FIG. 8, including non-planar, rounded, etc. For example, antenna 620 may be a 0.100 inch thick piece of gold-plated stainless steel. Antenna 620 can have any size, depending on the particular application. For example antenna 620 may be a 3.63 inch×3.63 inch square.

First compressible contact member 810 couples first output RF signal 508 to first point 612 of antenna 620. Second compressible contact member 812 couples second output RF signal 510 to second point 614 of antenna 620. For example, first and second contact members 810 and 812 couple contact points 604 and 608 of circuit board 600, shown in FIG. 6, with contact points 612 and 614 ("feed points") of antenna 620, shown in FIG. 7. First and second compressible contact members 810 and 812 can be any type of compressible electrical contacts, including "pogo"-type pins (as shown in FIG. 8)

(e.g., spring loaded) or conductive elastomer contacts (as shown in FIGS. 9 and 10). The bottom surface (and optionally the top surface) of antenna 620 may be passivated with gold, or other electrically conductive metal, to improve an electrical contact with first and second compressible contact members 810 and 812. Furthermore, contact members 810 and 812 may be plated with gold, or other electrically conductive material, to improve the electrical contact.

Compressible electrically insulating material 808 mounts antenna 620 on back plate 802. Compressible electrically insulating material 808 can be any type of compressible dielectric material, including a silicone dielectric material such as a high durometer silicone rubber elastomer (e.g., having a 60 durometer value). A 60 durometer silicone rubber simultaneously supplies strong physical support, impact energy absorption, and a low dielectric loss tangent supporting antenna 620, and thus does not dissipate RF power applied to antenna 620.

Compressible electrically insulating material 808 and first and second compressible contact members 810 and 812 provide for shock absorption during an impact on antenna 620 when antenna assembly 800 is used in an operational environment. Example environmental stresses that may be received by antenna assembly 800 are described more fully further below. Thus, insulating material 808 serves multiple purposes, including supporting and spacing antenna 620 from back plate 802, absorbing the energy of an impact to antenna 620, and weather proofing circuit board 600 mounted between antenna 620 and back plate 802.

First and second compressible contact members 810 and 812 provide mechanical compliance needed during physical impacts to antenna 620, while not significantly deviating in electrical conductivity during their compression. In particular, during compression, first and second compressible contact members 810 and 812 each experience a minor, but matched change in inductance, which therefore does not significantly impact performance.

As shown in FIG. 8, compressible electrically insulating material 808 may have a centrally located opening 820 to form an open space 822 between circuit board 600 and antenna 620. Space 822 is ideally kept free of moisture and other contaminants, to avoid compromising the contact of contact members 810 and 812 with antenna 620, and to avoid damage to circuit board 600. Alternatively, compressible electrically insulating material 808 may cover circuit board 600 to substantially fill space 822 between circuit board 600 and antenna 620 (such as shown in FIGS. 9 and 10).

Figure 11:
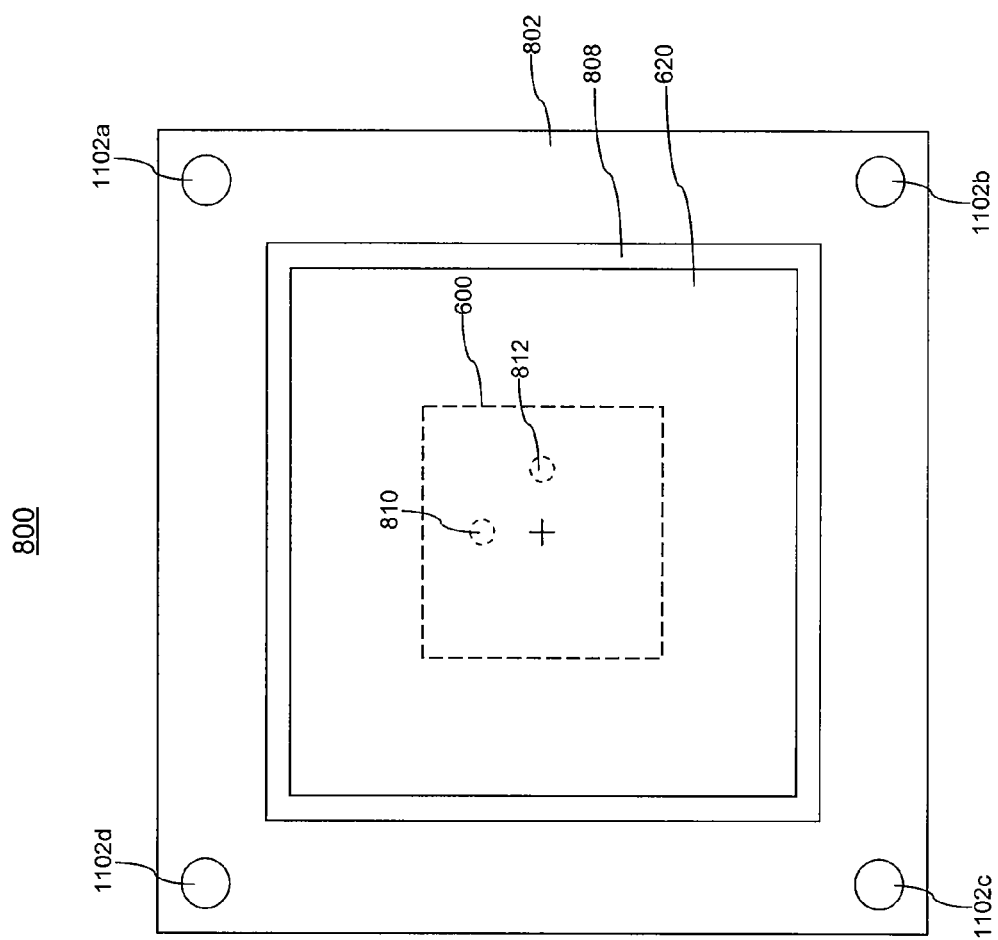

FIG. 11 shows a top view of antenna assembly 800 of FIG. 8. FIG. 11 shows antenna 620 supported on back plate 802 by compressible electrically insulating material 808. Furthermore, FIG. 11 shows an outline of the positions of circuit board 600 and compressible contact members 810 and 812, which are actually hidden below antenna 620. FIG. 11 also shows openings 1102a-1102d, located in corners of back plate 802, which may be used to mount antenna assembly 800 to a structure (e.g., using bolts, screws, nails, or other attachment elements). Any number or configuration of openings 1102, or other mounting mechanism, may be present for mounting antenna assembly 800, if desired for a particular application.

In one example, antenna 620 of FIG. 8 is a 3.75 inch×3.75 inch square patch antenna, that is a 0.1 inches thick steel plate. Insulating material 808 is a 4 inch×4 inch square, that is 0.2 inches thick. Back plate 802 is a 6 inch×6 inch square aluminum plate that is 0.25 inches thick. Thus, antenna assembly 800 of FIG. 8 has an approximate thickness of 0.55 inches. All components are contained within the low profile, protected structure of antenna assembly 800.

FIG. 9 shows a cross-sectional view of an antenna assembly 900, which is generally similar to antenna assembly 800. As described above, back plate 802 in antenna assembly 900 has recessed areas 816a and 816b formed respectively in both the top and bottom surfaces of back plate 802, around opening 814. Furthermore, compressible electrically insulating material 808 covers circuit board 600 to substantially fill the space between circuit board 600 and antenna 620. Air gaps 902 remain around the heads of screws 818, so that screws 818 may be easily accessed if compressible electrically insulating material 808 is peeled from back plate 802 (e.g., during maintenance of antenna assembly 900). As shown in FIG. 9, first and second compressible contact members 810 and 812 are conductive elastomer-type contacts. Conductive elastomer-type contacts may have less susceptibility to mechanical damage during compression of antenna assembly 900, and to environmental conditions, as compared to pogo-type contacts (e.g., degradation of the pogo contact-to-antenna interface, causing noisy contacts). A conductive adhesive may be used at the top and bottom locations of first and second compressible contact members 810 and 812 to provide reliable electrical contact with circuit board 600 and antenna 620.

Furthermore, circuit board 600 of FIG. 9 is inverted relative to circuit board 600 shown in FIG. 8 (e.g., quadrature hybrid coupler 514 is mounted to a bottom surface of circuit board 600 in FIG. 9). Furthermore, a bottom surface of circuit board 600 in FIG. 9 is coated with a weather sealant, to environmentally protect circuit board 600 and related components.

FIG. 10 shows a cross-sectional view of an antenna assembly 1000, which is generally similar to antenna assembly 900 of FIG. 9. As described above, back plate 802 in antenna assembly 1000 has a recessed area 816 formed in the top surface of back plate 802, around the perimeter of opening 814. Circuit board 600 is mounted to back plate 802 by positioning the edges of circuit board 600 in recessed area 816, and using an adhesive around the perimeter/bottom edge of circuit board 600 to hold circuit board 600 in recessed area 816. Furthermore, the adhesive may be conductive, to provide an improved electrical contact between circuit board 600 and back plate 802 (e.g., when grounded), if desired.

Furthermore, compressible electrically insulating material 808 covers circuit board 600 to substantially fill the space between circuit board 600 and antenna 620. As screws 818 are not necessary in antenna assembly 1000, air gaps 902 shown in FIG. 9 are not present. Thus, no spaces or voids are present in compressible electrically insulating material 808 in antenna assembly 1000. Thus, water and contaminants are displaced by compressible electrically insulating material 808, which reduces the risk of failure of antenna assembly 1000 due to the water or other contaminants reaching circuit board 600, or other components internal to antenna assembly 1000.

Antenna assembly 1000 has numerous benefits. For example, antenna assembly 1000 requires fewer components than antenna assemblies 800 and 900, thereby reducing costs. Furthermore, assembly of antenna assembly 1000 is simplified, as it can be formed as a laminated assembly. Antenna assembly 1000 is fully environmentally passivated.

CONCLUSION

While various embodiments of the present invention have been described above, it should be understood that they have been presented by way of example only, and not limitation. Note that numerous features described above can be implemented in data capture devices singly, or in any combination. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A rugged, mobile, wireless data capture device, comprising:
    a durable, sealed enclosure;
    a wireless microprocessor shock mounted within the enclosure;
    a radio frequency identification (RFID) reader coupled to the wireless microprocessor and mounted within the enclosure;
    an RFID antenna assembly communicatively coupled to the data capture device and mounted on the enclosure;
    a communications antenna mounted to the enclosure and communicatively coupled to the wireless microprocessor;
    a power supply system that supplies power to the data capture device; and
    mounting means for securing the enclosure to industrial equipment in a manner that mitigates effects of physical shock and vibration,
    wherein the RFID antenna assembly comprises a patch antenna, a back plate, and a compressible electrically insulating material that mounts the patch antenna to the back plate.

2. The device of claim 1, further including a laser scanner device communicatively coupled to the wireless microprocessor and mounted within the enclosure, the enclosure configured to permit transmission and reception of laser light by the laser scanner device.

3. The device of claim 1, further including an optical imager device communicatively coupled to the wireless microprocessor and mounted within the enclosure, the enclosure configured to permit the transmission and reception of visible light by the optical imager device.

4. The device of claim 1, further including an infra-red data association (IRDA) compatible transceiver coupled to the wireless microprocessor and mounted within the enclosure, the enclosure configured to permit the transmission and reception of infra-red light by the IRDA compatible transceiver.

5. The device of claim 1, wherein the wireless microprocessor wirelessly communicates with a remote communications network.

6. The device of claim 5, wherein the remote communications network is at least one of a wide area network (WAN), a local area network (LAN), a personal area network (PAN), and a global positioning system (GPS) network.

7. The device of claim 5, wherein the wireless microprocessor further includes a wired transceiver that communicates with a communication network via at least one of a universal system bus (USB), Ethernet, or Firewire.

8. The device of claim 1, wherein the wireless microprocessor is coupled to an audio circuit, the audio circuit being coupled to an audio speaker mounted on the durable enclosure.

9. The device of claim 1, wherein the power supply system further comprises:
    a battery charging circuit;
    a rechargeable battery removably coupled to the battery charging circuit;
    a connection means to an external power supply; and
    a power management system coupled to the power supply system that regulates power distribution to various components of the wireless data capture device.

10. The device of claim 9, wherein the connection means comprises charging contacts external to the durable sealed enclosure.

11. The device of claim 10, wherein the charging contacts are external electro-mechanical make-or-break contacts.

12. The device of claim 10, wherein the charging contacts are inductive coupling make-or-break contacts.

13. The device of claim 9, wherein the connection means comprises an external cable connector.

14. The device of claim 9, wherein the power management system is communicatively coupled to an external battery charging accessory that monitors the state of charge and adjusts the rate of charge of a spare removable rechargeable battery according to instructions from the power management system.

15. The device of claim 9, wherein the power management system establishes a duty cycle wherein various components of the wireless data capture device are powered on and off based on predetermined time intervals.

16. The device of claim 9, wherein the power management system is coupled to a proximity sensor wherein various data capture device components are powered on and off depending on the proximity of freight or other items having information to be captured.

17. The device of claim 16, wherein the proximity sensor uses infrared switch technology.

18. The device of claim 16, wherein the proximity sensor uses optical switch technology.

19. The device of claim 16, wherein the proximity sensor uses sonic switch technology.

20. The device of claim 9, wherein the power management system is coupled to a motion sensor that allows various data capture device components to be powered on or off depending on motion of the wireless data capture device.

21. The device of claim 20, wherein the motion sensor uses an accelerometer.

22. The device of claim 20, wherein the motion sensor uses a strain gauge.

23. The device of claim 20, wherein the motion sensor uses a piezoelectric material.

24. The device of claim 20, wherein the motion sensor uses micro-electronic machine technology (MEMs).

25. The device of claim 20, wherein the motion sensor uses switch technology.

26. The device of claim 1, wherein the wireless data capture device includes a manual trigger for turning wireless data capture device on and off.

27. The device of claim 26, wherein the manual trigger is a wireless mobile device that communicates via a communications network.

28. The device of claim 26, wherein the manual trigger is a wired device that communicates via a communications network.

29. The device of claim 26, wherein the manual trigger is a wired device that communicates via discrete cables.

30. The device of claim 1, wherein the wireless data capture device antennas are mounted flush with an external surface of the durable, sealed enclosure.

31. The device of claim 1, wherein the wireless data capture device antennas are mounted within the durable, sealed enclosure, the enclosure permitting the transmission and reception of the signals.

32. The device of claim 1, wherein the wireless data capture device antennas are mounted proud of the external surface of the durable, sealed enclosure.

33. The device of claim 1, wherein the wireless data capture device includes external antenna ports that support use of external wired antennas.

34. The device of claim 1, wherein the durable sealed enclosure is configured to withstand direct impacts and shock loads due to close proximity of freight being transferred.

35. The device of claim 1, wherein the durable sealed enclosure prevents the penetration of dust and water.

36. The device of claim 1, wherein the durable sealed enclosure is manufactured from die cast metallic, thixo-molded metallic, and injection molded plastic.

37. The device of claim 1, wherein the mounting means include external or internal vibration / shock mounts coupled to the durable sealed enclosure and internal electronics.

38. The device of claim 1, wherein the mounting means comprises a mounting plate.

39. The device of claim 1, wherein the mounting means comprises a mounting cradle.

40. The device of claim 1, wherein the mounting means comprises a mounting bracket.

41. A rugged, mobile, wireless data capture device, comprising:
means for durably enclosing and sealing the device;
means for shock mounting a wireless microprocessor within the enclosure means;
means for coupling a radio frequency identification (RFID) reader to the wireless microprocessor and for mounting the RFID reader within the enclosure means;
means for communicatively coupling an RFID antenna assembly to the data capture device and for mounting the RFID antenna on the enclosure means;
means for mounting a communications antenna to the enclosure means and for communicatively coupling the communications antenna to the wireless microprocessor;
means for supplying power to the data capture device; and
mounting means for securing the enclosure means to industrial equipment in a manner that mitigates effects of physical shock and vibration,
wherein the RFID antenna assembly comprises a patch antenna, a back plate and a compressible electrically insulating material that mounts the patch antenna to the back plate.

42. The device of claim 41, wherein the power supply means further comprise:
means for charging a battery;
means for removably coupling a rechargeable battery to the battery charging circuit;
means for coupling the battery charging means to an external power supply; and
power management means coupled to the power supply system for regulating power distribution to various components of the wireless data capture device.

43. The device of claim 42, further comprising means for communicatively coupling the power management means to an external battery charging accessory for monitoring the state of charge and adjusting the rate of charge of a spare removable rechargeable battery, according to instructions from the power management means.

44. The device of claim 1, wherein the mounting means secures the enclosure to a forklift between the forks in the load back rest area.

45. The device of claim 1, wherein the RFID antenna assembly further comprises:
a circuit board supported by the back plate, wherein the circuit board is configured to receive an input radio frequency (RF) signal and outputs a first output RF signal and a second RE output signal;
a first compressible contact member that couples the first output RF signal to a first point of the patch antenna; and
a second compressible contact member that couples the second output RF signal to a second point of the patch antenna.

46. The device of claim 41, wherein the mounting means secures the enclosure to a forklift between the forks in the load back rest area.

47. The device of claim 41, wherein the RFID antenna assembly further comprises:
a circuit board supported by the back plate, wherein the circuit board is configured to receive an input radio frequency (RF) signal and outputs a first output RF signal and a second RF output signal;
a first compressible contact member that couples the first output RF signal to a first point of the patch antenna; and
a second compressible contact member that couples the second output RF signal to a second point of the patch antenna.

* * * * *

UNITED STATES PATENT AND TRADEMARK OFFICE
CERTIFICATE OF CORRECTION

PATENT NO. : 7,504,948 B2
APPLICATION NO. : 11/410964
DATED : March 17, 2009
INVENTOR(S) : Wulff et al.

Page 1 of 1

It is certified that error appears in the above-identified patent and that said Letters Patent is hereby corrected as shown below:

ON THE TITLE PAGE

1. On the Title Page, in Field (75), under "Inventors", in Column 1, Line 1, delete "No." and insert -- North --, therefor.

2. On the Title Page, in Field (56), under "OTHER PUBLICATIONS", in Column 2, Lines 1-2, delete "O'Connor, C. Mary, Smart..........................RFID Journal.".

IN THE SPECIFICATION

3. In Column 8, Line 3, delete "10" and insert -- 110 --, therefor.

4. In Column 8, Line 17, delete "10" and insert -- 110 --, therefor.

5. In Column 8, Line 64, delete "(IMI)" and insert -- (IMD) --, therefor.

IN THE CLAIMS

6. In Column 16, Line 25, in Claim 45, delete "RE" and insert -- RF --, therefor.

Signed and Sealed this
Fourth Day of October, 2011

David J. Kappos
*Director of the United States Patent and Trademark Office*